United States Patent [19]
Woods et al.

[11] Patent Number: 5,777,246
[45] Date of Patent: Jul. 7, 1998

[54] FASTENER MEASUREMENT SYSTEM

[75] Inventors: Mark Allen Woods, Renton; Bruce Stanley Howard, Bellevue; Victor Gary Hart, Kent, all of Wash.

[73] Assignee: The Boeing Company, Seattle, Wash.

[21] Appl. No.: 710,699

[22] Filed: Sep. 19, 1996

Related U.S. Application Data

[60] Provisional application No. 60/004,225, Dec. 1, 1995.
[51] Int. Cl.$^6$ .................................................. G01M 19/00
[52] U.S. Cl. ...................... 73/865.8; 33/567.1; 33/567; 33/501.05; 209/929; 209/601; 73/1.81
[58] Field of Search ........................... 73/1 J, 865.9, 73/865.8, 1.81; 33/832, 833, 501.05, 567, 567.1; 209/601, 604, 929

[56] References Cited

U.S. PATENT DOCUMENTS

| | | |
|---|---|---|
| 3,212,193 | 10/1965 | Raccio . |
| 4,139,947 | 2/1979 | Possati . |
| 4,492,035 | 1/1985 | Doninelli . |
| 4,615,112 | 10/1986 | Shannon ........................... 209/929 |
| 4,877,138 | 10/1989 | Motiwald ........................... 209/929 |
| 4,905,842 | 3/1990 | Habele et al. ...................... 209/929 |
| 4,918,825 | 4/1990 | Lesh et al. ........................ 33/833 |
| 5,012,592 | 5/1991 | Greenslade ....................... 33/833 |
| 5,189,808 | 3/1993 | Evans et al. . |

*Primary Examiner*—Hezron E. Williams
*Assistant Examiner*—Nashmiya Ashraf
*Attorney, Agent, or Firm*—Christensen O'Connor Johnson & Kindness PLLC

[57] ABSTRACT

A fastener measurement system includes a number of gauge blocks, each having a tapered bore disposed therein. Each gauge block has a number of conical inserts that fit within the tapered bore. The inserts have a central bore of varying sizes to receive fasteners of different shank diameters. The gauge block includes a beveled surface at the point where the bore meets a top surface of the gauge block. The beveled surface reduces wear and allows the gauge block to be easily calibrated. A computer system receives measurements made by a linear transducer that measures the height of the fastener above the surface of the gauge block a correction factor $\delta$ is added to the height measured to produce an indication of the true head height of the fastener. The computer system prompts the user to test the head heights of a random sample of fasteners and prints a report of the head heights as well as an indication of whether the sample of fasteners meets engineering specifications.

9 Claims, 8 Drawing Sheets

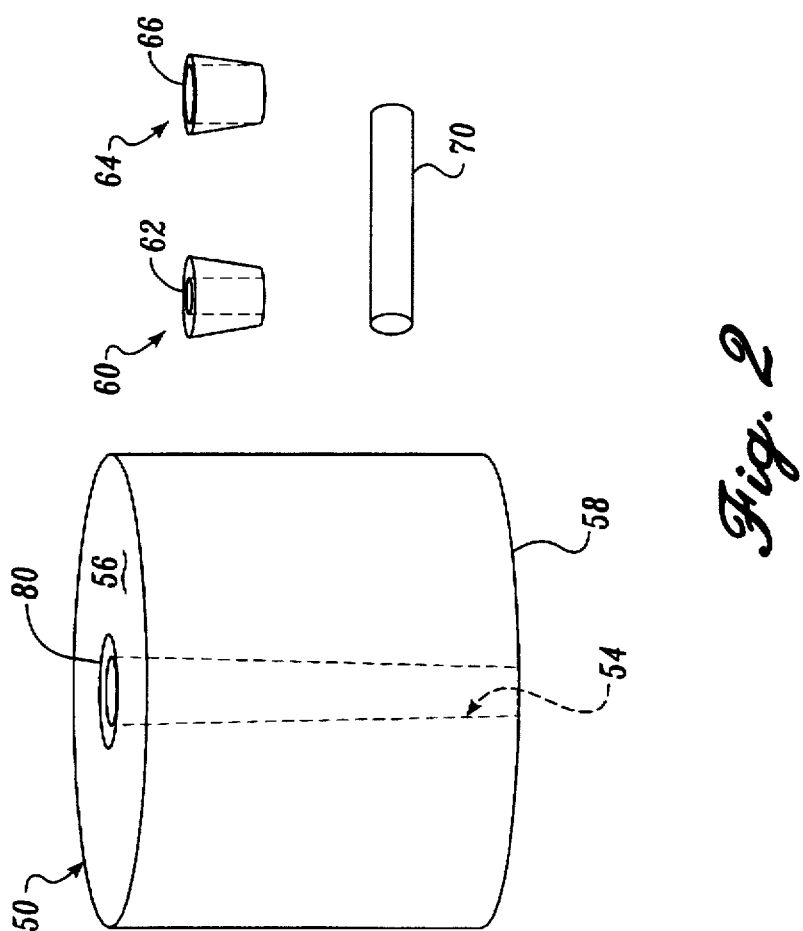

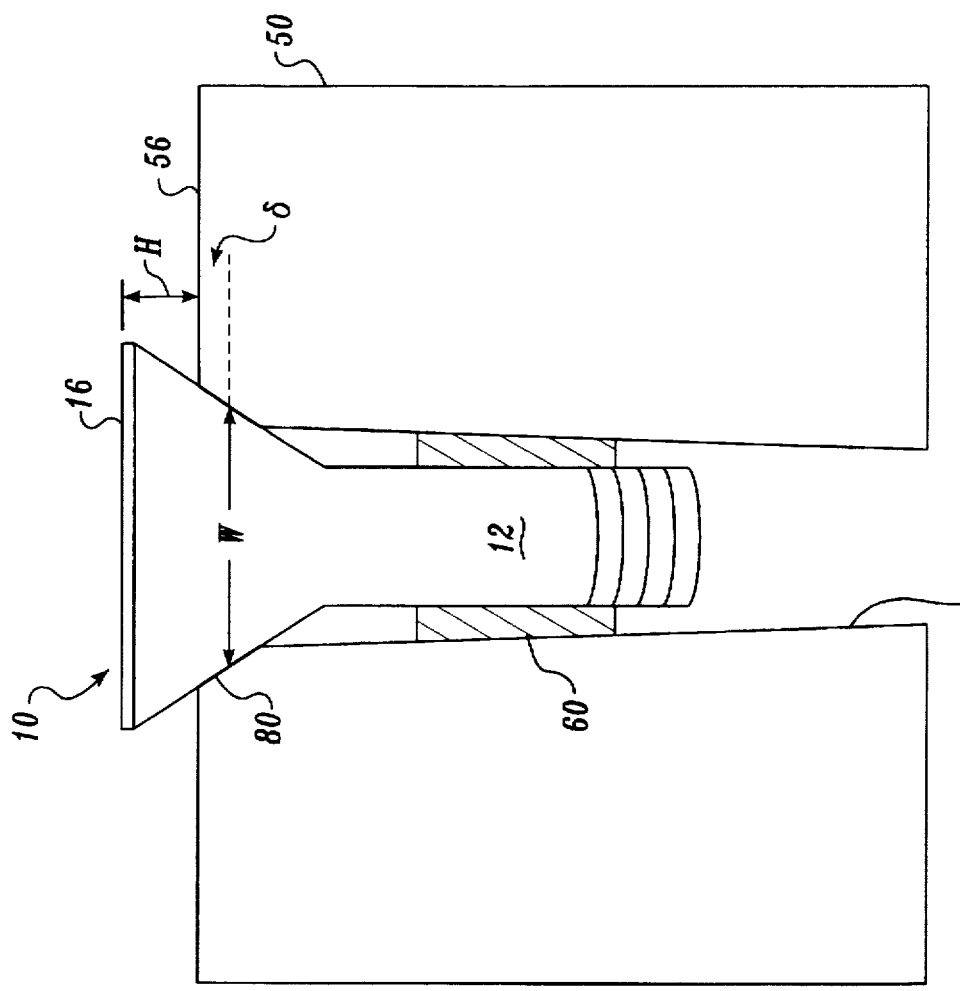

FASTENER MEASUREMENT SYSTEM

RELATED APPLICATION

The present application claims the benefit of U.S. Provisional Application No. 60/004,225, filed on Dec. 1, 1995.

FIELD OF THE INVENTION

The present invention relates to measurement systems in general, and in particular, to systems for measuring the head height of flushhead fasteners.

BACKGROUND OF THE INVENTION

As part of the continuing effort to improve the quality of its aircraft, the Boeing Company has devoted considerable effort to finding improved methods of fastener installation. Fasteners, including countersunk rivets and bolts, are the most commonly used mechanism for securing one part to another on the exterior of an aircraft. The quality of a flushhead fastener installation is highly dependent on the height of the fastener head with respect to its surrounding metal surface. Fasteners that are installed too high are a source of aerodynamic drag and are difficult to paint over. Conversely, fasteners that are installed too shallow produce noticeable dimples in the paint and are more likely to allow corrosion in the surrounding metal.

One requirement necessary for a quality fastener installation is to ensure that the hole in which the fastener is placed and the depth of the countersink are correctly drilled. Equally as important however, are the dimensions of the fasteners themselves. The most critical fastener dimensions required for a quality installation are the shank diameter and the head height. Variations in either dimension of more than ±0.001 inch will affect the quality of the installed fastener joint.

Large commercial airplane manufacturers, such as the Boeing Company, typically receive fasteners from multiple suppliers. These fasteners are generally received on pallets at a central location. Each pallet contains many boxes of fasteners of a given size or design. Upon receipt, a quality control inspector opens several of the boxes and tests a specified number of randomly selected fasteners to determine if they meet engineering specifications. Based on this random test, the entire pallet is either accepted or rejected.

In the past, fastener head height tolerances were checked using a gauge block. A gauge block is a piece of hardened steel having a countersunk bore of a known diameter drilled in it. The hole diameter at the center of the gauge block is equal to the shank diameter of the fastener so that the fastener fits snugly in the gauge block. In addition, the diameter of the countersunk portion is slightly smaller than the maximum diameter of the fastener head.

To measure the head height of the fastener using a prior art gauge block, the fastener is inserted in the countersunk bore and an accurate measurement tool is used to measure the height of the fastener head above the surrounding surface of the gauge block. Under perfect conditions, the gauge block works well for measuring the head height of a fastener. However in practice, this system has many drawbacks. First, the gauge blocks are only designed to test a particular size of fastener. In an aircraft where many different types of fasteners are used, it was necessary to provide a gauge block for each fastener size. At the Boeing Company, approximately 186 different sizes of gauge blocks were required to test all the commonly used sizes and styles of fasteners with multiple sets of all 186 blocks being disposed throughout the factory. Each gauge block had to be maintained and periodically calibrated to account for wear. Secondly, it was found that the prior art gauge blocks were difficult to standardize. Therefore, it was often the case that two people measuring the same fastener on different versions of the same size gauge block would measure different head heights. Given the shortcomings in the prior art fastener measurement systems, there is a need for a fastener head height measuring system that reduces the need of a separate gauge block for each fastener size and for a gauge block that is easy to manufacture and standardize.

SUMMARY OF THE INVENTION

To eliminate the problems associated with prior art fastener measurement systems, the present invention utilizes a gauge block having a tapered bore disposed through its center. Each gauge block includes one or more conical inserts that can be fitted into the tapered bore. Each conical insert has a cylindrical bore through its center that is designed to receive a fastener of a predetermined shank diameter. The tapered bore is beveled at the point where a top surface of the gauge block meets the tapered bore. The beveled surface, which is cut at the same angle as the included angle of the fastener head, is resistant to wear and allows the gauge block to be easily calibrated.

To measure the head height of a fastener, the fastener is inserted into the gauge block and a linear transducer is used to measure the height of the head above the top surface of the gauge block. A correction factor $\delta$, is added to the height measured to compensate for the beveled surface and to produce an indication of the true head height of the fastener. The output of the linear transducer is coupled to a dedicated computer system that records the head height and determines whether the fastener meets engineering specifications. The computer system reads data from two memory key-like, user-insertable, non-volatile memory devices. The first memory key stores information concerning the calibration of the gauge block and the correction factor $\delta$. The second memory key includes information concerning the engineering tolerances of the type of fastener to be measured.

To calibrate the gauge block and to determine the correction factor $\delta$, a pair of accurately-ground, spherical balls are used. The balls are placed in the beveled portion of the tapered bore and the height of the balls above the top surface of the gauge block is measured. From the two heights, the gauge block is calibrated and the correction factor $\delta$ is determined.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is an isometric view of a gauge block according to the present invention;

FIG. 3 is a cross-sectional view of the gauge block according to the present invention with a fastener in position to measure;

DETAILED DESCRIPTION OF THE PREFERRED EMBODIMENT

The present invention is a fastener head height measurement system that eliminates the need to use a separate gauge block for every size of fastener to be measured. The system includes a dedicated computer system that prompts a user to measure a number of fasteners and produces a printed record of whether the fasteners meet engineering specifications.

Figure 1:
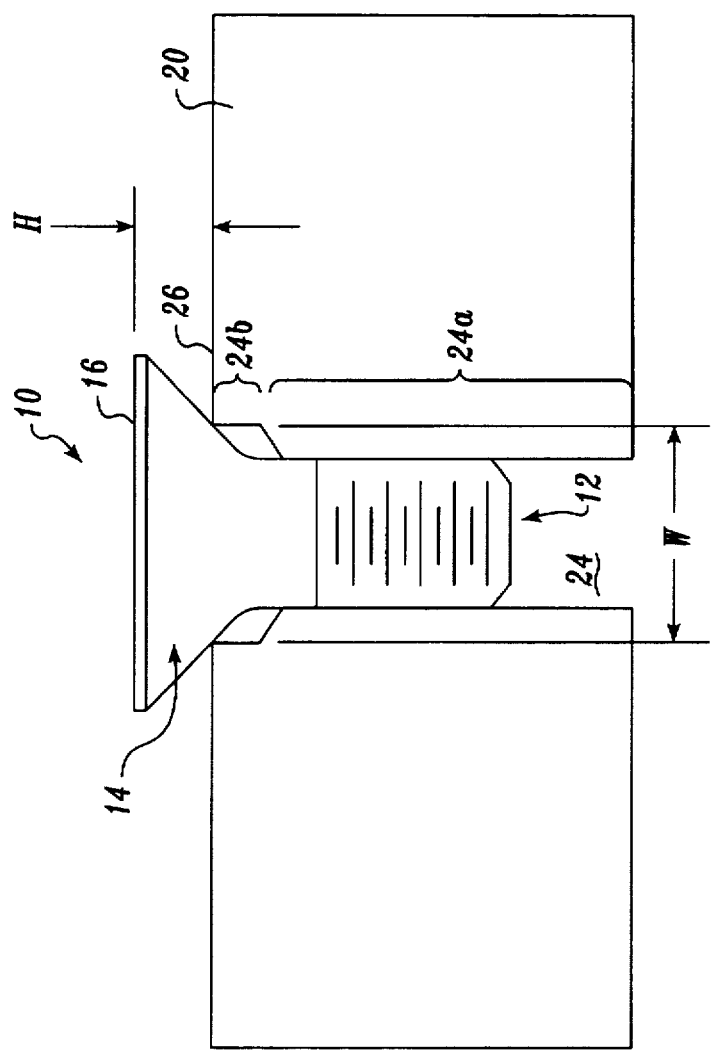
FIG. 1 is a cross-sectional view of a prior art gauge block.

As indicated above, fasteners used in aircraft construction are manufactured to extremely tight tolerances. The most critical dimensions of a fastener that are required to ensure a quality installation are its shank diameter and its head height. FIG. 1 shows a typical fastener 10 to be installed in an aircraft. The fastener 10 has a shank 12 which may or may not be threaded and a head 14 that is designed to be seated in a countersunk bore drilled in the parts to be secured. The head height of the fastener is defined as the distance between a top surface 16 of the fastener and a point on the head having a diameter W. Different styles or sizes of fasteners have different W values.

In the past, a gauge block 20 was used to measure the head height of the fastener. The gauge block 20 is a block of hardened steel having a countersunk bore 24 drilled through its center. A main portion 24a of the bore has a diameter equal to the shank diameter of the fastener to be measured. A countersunk portion 24b has a diameter equal to the dimension W that is defined for the particular fastener to be measured.

To measure the head height of the fastener 10, the fastener is inserted into the bore 24 and the height, H, of the top surface 16 of the fastener is measured with respect to a top surface 26 of the gauge block. If the height falls within a predetermined range, the fastener head is considered "in tolerance" and is accepted. If not, then the fastener head is considered "out of tolerance" and is rejected.

The design of the gauge block 20 shown in FIG. 1 presents several problems that limit its ability to accurately determine the head height of a fastener. First, the countersunk portion 24b of the bore is drilled perpendicular to the top surface 26 of the gauge block. In theory, this will produce a sharp "knife edge" at the point where the bore 24 meets the top surface 26 of the gauge block. However, in practice, the lip is not completely square, and may be out-of-round thereby making it difficult to accurately measure the diameter of the countersunk portion of the bore. Further, fasteners with painted finishes may be damaged by the knife edge if it cuts into the painted finish. Additionally, the lip of the countersink tends to wear over time, thereby widening its diameter decreasing the apparent head height of fasteners placed in the gauge block. Finally, the main portion 24a of the bore has a diameter that is only designed for one size of fastener. Fasteners having a larger shank dimension will not fit in the gauge block. Similarly, fasteners having a smaller shank diameter may sit off center in the bore 24 and produce inaccurate readings. Therefore, it has been necessary to provide a separate gauge block for each style or size of fastener to be measured.

FIG. 2 illustrates a gauge block that is made according to the present invention. The gauge block 50 is a generally cylindrical piece of hard, wear resistant material, such as tool steel, having a tapered, cylindrical bore 54 drilled through its center. The diameter of the tapered bore 54 is larger at a top surface 56 of the gauge block and narrows toward a bottom surface 58 of the gauge block. Included with the gauge block are one or more conically shaped inserts 60, 64. Each insert has a tapered outer diameter that allows it to fit snugly within the tapered bore 54 of the gauge block. Each insert has a central bore having a diameter that is sized to receive a fastener of a predefined shank dimension. For example, an insert 60 has a bore 62 designed to receive a fastener with a first shank diameter. Similarly, an insert 64 has a larger diameter bore 66 that is designed to receive a fastener with a larger shank diameter. Once an insert is fit into the tapered bore 54, a small nylon rod 70 can be used from the bottom of the gauge block to pop the insert out of the tapered bore 54. By using the conical inserts 60 and 64, it is possible to use a single gauge block to measure the head height of fasteners with various shank diameters.

The gauge block further includes a beveled or chamfered edge 80 at the point where the top surface 58 of the gauge block meets the tapered bore 54. The angle of the bevel is cut at the same angle as the fastener heads. If the bevel angle is greater than the head angle, the fastener head will contact the bevel at its deepest point and may indicate that the head height is lower than it actually is. If the bevel angle is less than the head angle, the fastener will contact the bevel at the top surface of the gauge block and may indicate that the head height is larger than it actually is. In addition, a bevel which closely matches the conical surface of the fastener heads, will not damage the finishes of the fasteners. The beveled edge 80 provides several advantages over the knife edge found in prior art gauge blocks. First, the chamfered edge does not wear as readily, thereby increasing the time between which the block must be calibrated. It does not damage painted finishes on fasteners. The chamfered edge 80 permits the gauge block to be easily calibrated and can be used to measure fasteners of more than one "W" gauge diameter.

FIG. 3 illustrates how the gauge block 50 is used to measure the head height of a fastener 10. First, a conical insert 60 having a central bore diameter that matches the shank diameter of the fastener to be measured is inserted into the tapered bore 54. Once the conical insert 60 is in place, the shank 12 of the fastener is fit through the central bore of the insert. Next, a measuring device, such as a mechanical or electrical dial gauge or a linear transducer, is used to measure a height, H, between the top surface 16 of the fastener and the top surface 56 of the gauge block. Because of the chamfered edge 80, the tapered bore does not have a diameter W at a point that is co-planer with the top surface 56 of the gauge block. Rather, the point at which the diameter of the bore is equal to W is on the chamfered surface. Therefore, the height, H, as measured, will not be the true height of the fastener and a correction factor $\delta$ must be added to the measured height H in order to find the true head height of the fastener.

Figure 4B:
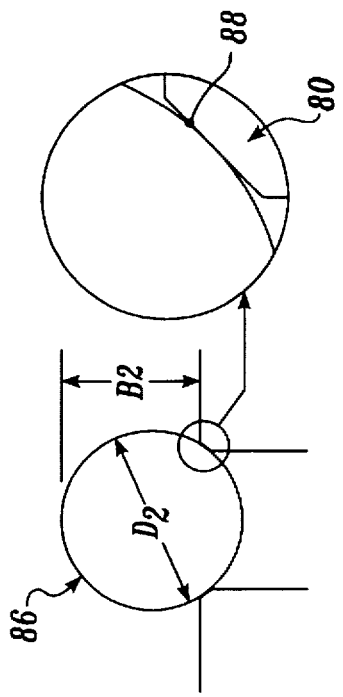
FIGS. 4A–4C illustrate how the gauge block according to the present invention is calibrated.
Figure 4C:
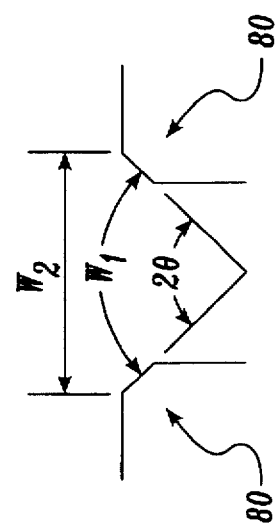
Figure 4A:
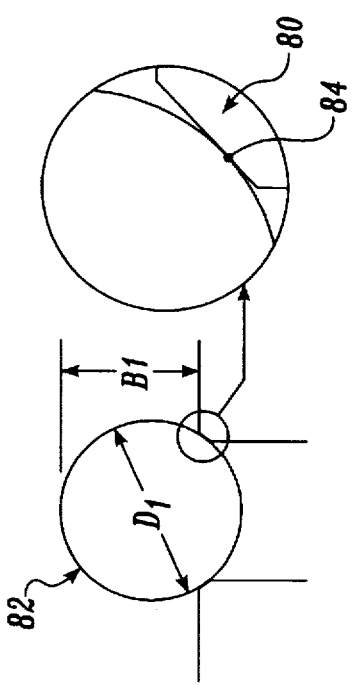

FIGS. 4A-4C illustrate the presently preferred method of calibrating the gauge block to determine the correction factor $\delta$. The correction factor $\delta$ is dependent on the dimensions of the chamfered edge 80 and the gauge diameter W of the fastener. As shown in FIGS. 4A and 4B, two precisely ground calibration balls 82, 86 having known diameters are placed in the chamfered edge 80 of the gauge block. The first ball 82 has a diameter $D_1$ and the second ball 86 has a slightly larger diameter $D_2$. Preferably the diameter $D_1$ of the first ball 82 is selected so that a tangent point 84 (FIG. 4A) defined as the point where the surface of the ball 82 engages the chamfered surface 80 is located approximately eighty percent of the way along the length of the chamfered surface as measured from the top of the gauge block. Similarly, the diameter $D_2$ of the second ball 86 is selected so that a tangent point 88 (FIG. 4B) defined as the point where the surface of the second ball 86 engages the chamfered surface is located approximately twenty percent along the length of the chamfered surface as measured from the top of the gauge block.

After each ball is placed into the chamfered edge of the gauge block, the height of the ball above the top surface of the gauge block is measured. The first ball 82 has a height $B_1$ above the top surface of the gauge block and the second ball 86 has a height $B_2$ above the top surface of the gauge block.

From the heights $B_1$, $B_2$ of the balls, it can be shown that the angle $\theta$ at which the chamfered edge is cut in the gauge block is defined by the equation:

$$\sin\theta = \frac{D_2 - D_1}{2(B_2 - B_1) - D_2 + D_1} \quad (1)$$

Once the angle $\theta$ has been determined, the width $W_2$ (shown in FIG. 4C) of the tapered bore at the point where the chamfered edge meets the top surface of the gauge block can be determined mathematically according to the equation:

$$W_2 = D_2 \cos\theta + (D_2)(1+\sin\theta) - 2B_2)\tan\theta \quad (2)$$

Once the diameter $W_2$ of the chamfered edge has been computed, the correction factor for the particular gauge block and fastener can be determined according to the equation:

$$\text{For } \theta \leq \theta_{NOM}, \delta = \frac{W_2 - W}{2\tan\theta_{NOM}} \; ; \quad (3)$$

$$\text{For } \theta > \theta_{NOM}, \delta = \frac{W_2 - W}{2\tan\theta} + \frac{W_1 - W}{2\tan\theta_{NOM}}$$

Where $\theta_{NOM}$ is the half angle of the conical portion of the fastener head, W is the gauge diameter defined for a particular fastener to be measured and $W_1$ is the diameter of the chamfered edge at the point where the chamfered edge 80 meets the tapered bore. This measurement $W_1$ can be accurately measured at the time the gauge block is constructed because it is not subject to wear.

In the presently preferred embodiment of the invention, the calibration balls 82 and 86 are made of a tungsten carbide material and are available from Spheric, Inc. of Rancho Cucamonga, Calif. or Industrial Tectonics, Inc. of Ann Arbor, Mich. The sphericity of each ball should be accurate to 0.00003 inches and the diameter of the ball should be accurate to ±0.001 inch. The height of the balls $B_1$, $B_2$ above the top surface of the gauge block should be measured to within ±0.00003 inches in a temperature stable environmental that does not vary by more than ±1.5° F.

Figure 5:
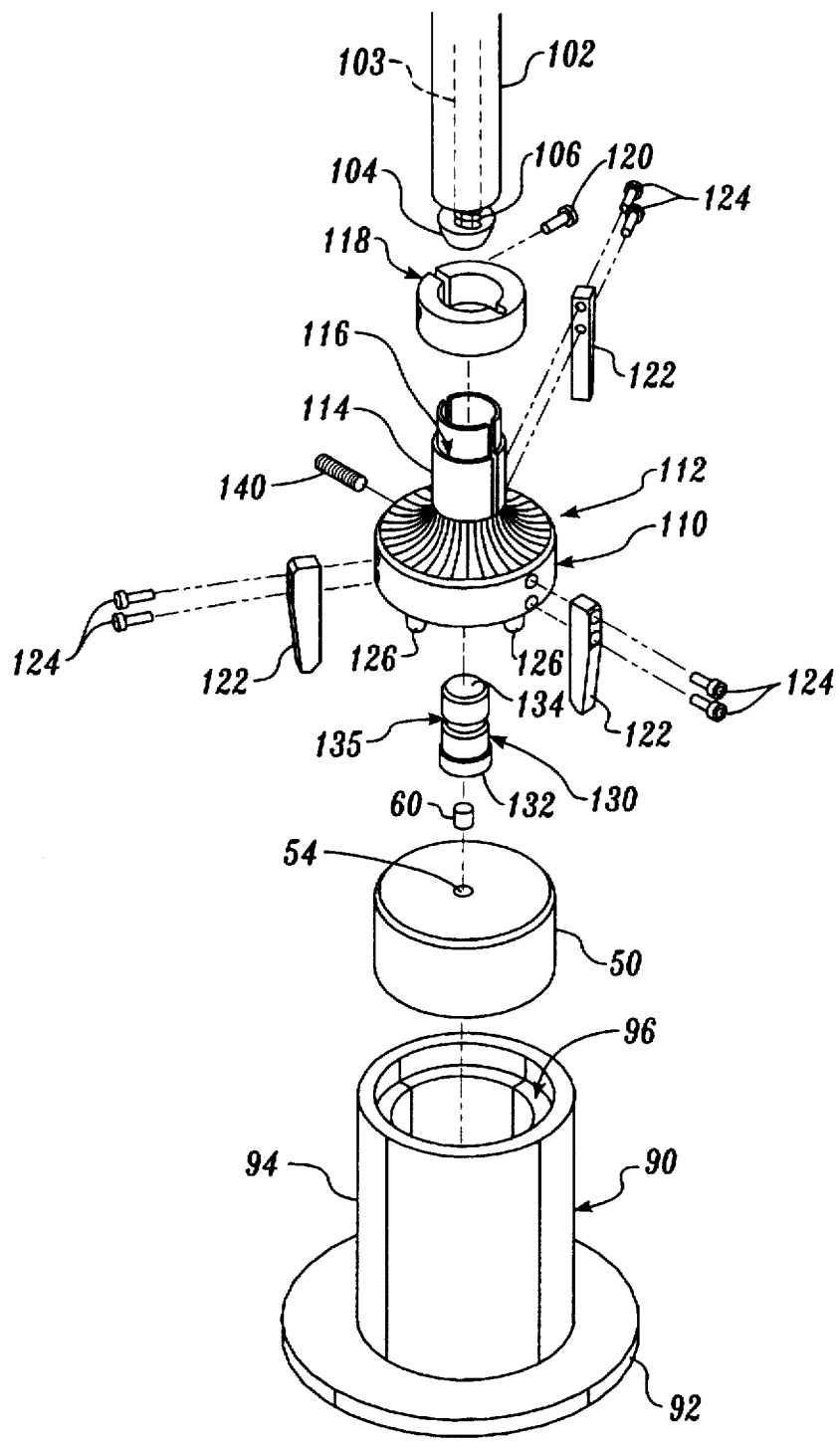
FIG. 5 is an isometric view of a fastener head height measuring system according to the present invention with the parts shown in an exploded relationship.

FIG. 5 illustrates the fastener head height measuring system according to the present invention with the parts shown in an exploded relationship. In order to allow the gauge block 50 to be used with fasteners having long shanks, the gauge block is supported in a gauge stand 90. The stand 90 includes a circular base 92 that supports a cylindrical sleeve 94. The sleeve has an inner shoulder 96 that supports the gauge block 50.

After the proper conical insert 60 is inserted into the tapered bore 54 of the gauge block, a fastener (not shown) is inserted into the block and its head height is measured with a probe assembly 100. The probe assembly includes a linear transducer 102, which in the currently preferred embodiment of the invention is a Sony Magnascale linear transducer. The transducer that has an internal rod 103 that is magnetically encoded to register changes in position. As the internal rod 103 is moved, a magnetic read head within the transducer reads the magnetic encodings and produces electrical signals indicative of the direction and length of movement of the internal rod 103. A round, button-shaped tip 104 is secured to the end of the rod 103 and is biased outward by a spring 106 that is disposed between the tip 104 and the end of the transducer 102. The spring 106 operates to return the rod to its fully extended position when not compressed.

The transducer 102 is secured within a gauge head 110 that comprises a generally circular base portion 112, a tapered neck portion 114 and a large central bore 127. The neck is split in two semi-circular halves so that the neck can be compressed about the transducer 102 in order to clamp the transducer in the gauge head. The outer circumference of the neck is stepped to create a shoulder 116 that supports a clamp collar 118. To secure the transducer 102 within the gauge head 110, the transducer is fitted through the central bore 127 and the clamp collar 118 is seated on the shoulder 116. A machine screw 120 tightens the clamp collar in order to secure the transducer 102 in the gauge head 110.

Three centering legs 122 are positioned at equal intervals around the outer circumference of the base portion 112 of gauge head 110. The centering legs are secured to the gauge head using a plurality of machine screws 124. The centering legs operate to position the gauge head over the center of the gauge block 50. Secured to a bottom surface of the base portion of the gauge head are a set of three carbide hemispherical points 126 that form a tripod upon which the gauge head rests when seated upon the top surface of the gauge block 50. The central bore 127 of the gauge head is brought to final size after the carbide points 126 are installed to ensure that the bore 127 is perpendicular to the plane defined by the three carbide points.

Figure 6:
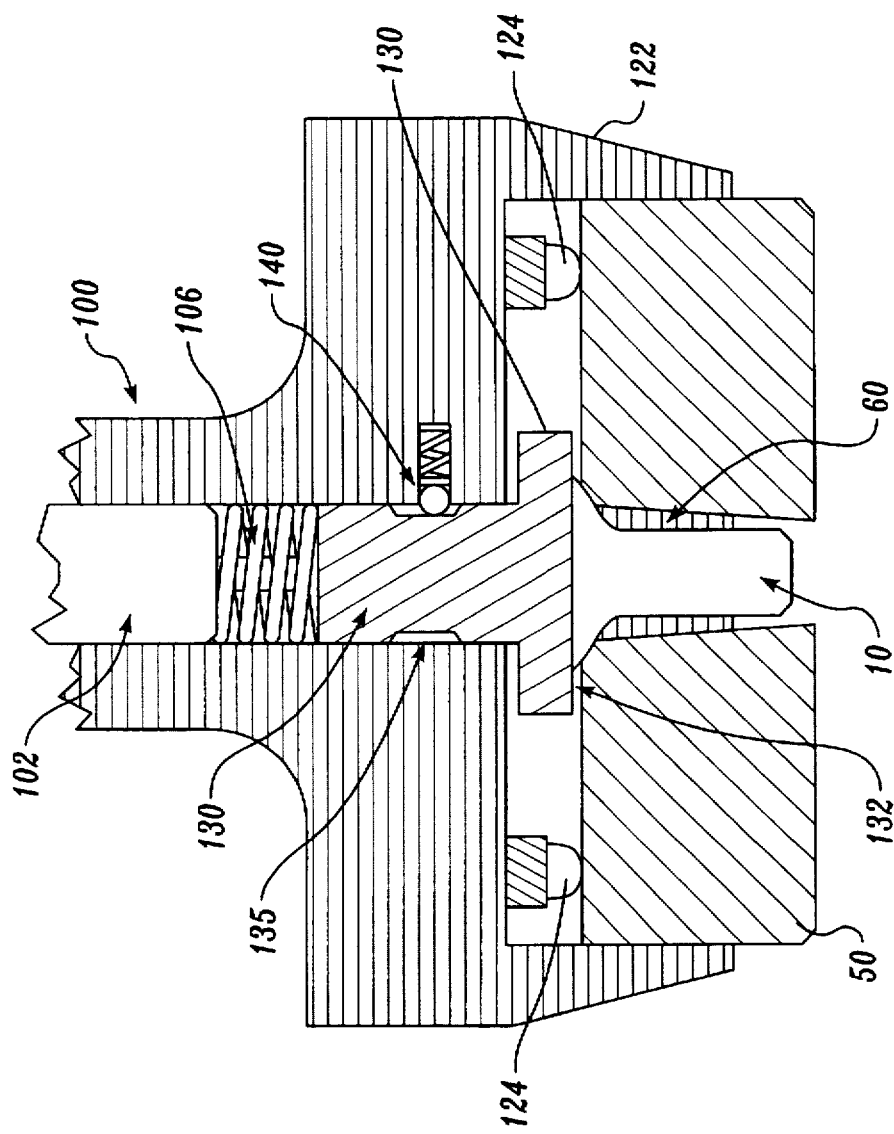
FIG. 6 is a detailed, cross sectional view illustrating how the gauge block of the present invention operates in conjunction with a linear transducer to measure the head height of a fastener.

A stylus or cylindrical pin 130 is inserted into the central bore 127 at the base of the gauge head. The stylus is held in place within the bore 127 by a spring plunger 140 mounted in the base portion of the gauge head. The stylus 130 has a lower surface 132 that engages the head of the fastener to be measured and an upper surface 134 that engages the probe tip 104 disposed at the end of the internal rod of the transducer 102. As can be seen in FIG. 6, the stylus has a race 135 disposed about its circumference. When the stylus is installed in the gauge head, the width of the race cooperates with the spring plunger to limit the range in which the stylus can be moved.

The gauge head can accept a variety of stylus designs. For example, the bottom surface 132 of some stylus inserts is not flat on the bottom surface but has a recess or depression that is designed to fit over a raised crown portion of some fastener heads.

When the probe assembly 100 is placed over the gauge block, the bottom surface 132 of the stylus engages the head of the fastener 10 whose head height is to be measured. The stylus is pushed into the gauge head by the fastener causing the linear transducer 102 to produce a signal indicative of the height of the transducer above the top surface of the gauge block. This head height is then compensated for the correction factor δ as described above and the head height of the fastener is then recorded.

Figure 7:
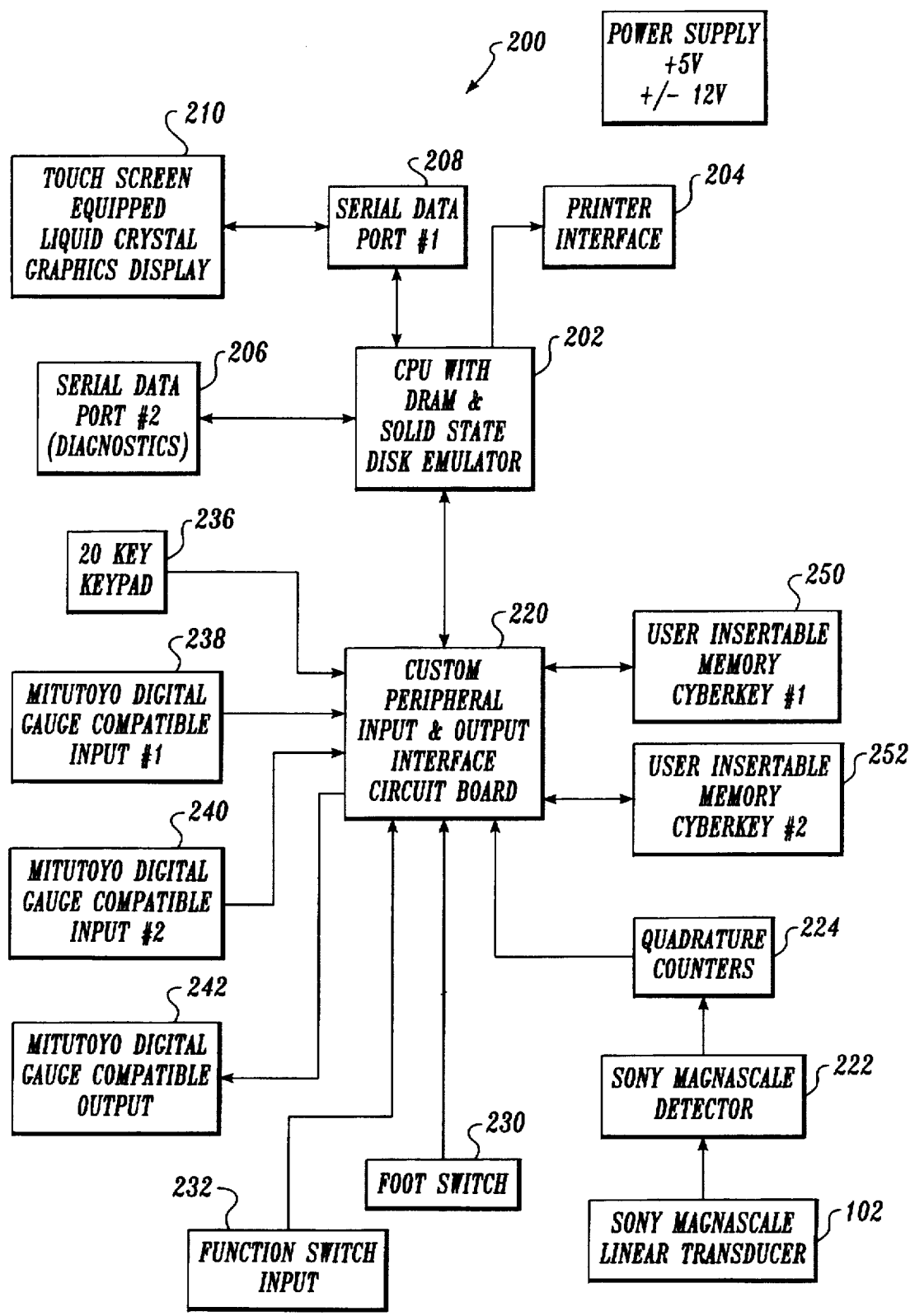
FIG. 7 is a block diagram of a computer system that operates the fastener head height detection system according to the present invention.

The output of the linear transducer 102 described and shown in FIGS. 5 and 6 is coupled to a dedicated microprocessor-based computer system 200 shown in FIG. 7. The computer system 200 comprises a central processing unit 202 having an internal dynamic RAM and solid state disk emulator. Preferably, the CPU 202 comprises a model number core module/XT plus manufactured by Ampro Computers, Inc. Directly coupled to and located on the same physical circuit board with the CPU 202 are a printer interface circuit 204 and a pair of serial ports 206 and 208. The serial port 206 is used to upload new software into the central processing unit. The serial port 208 drives a touch sensitive LCD screen 210 that serves as the interface between a user and the computer system unit.

Also coupled to the CPU 202 is a peripheral input/output interface circuit 220. This circuit allows the central processing unit to communicate with a number of external devices that are described below.

The output signals produced by the linear transducer 102 are received by a Sony Magnascale detector circuit 222 that is located in the system electronics enclosure. The output of the detector circuit comprises two quadrature square waves. Each rising edge of a square wave is indicative of 0.000025 inches of movement of the internal rod of the transducer. By comparing the relative phase of the two square waves, it is possible to determine the direction of movement of the internal rod. The output of the detector circuit 222 is fed into a quadrature counter 224 that is implemented in hardware within the input/output circuit 220. The quadrature counter 224 converts the square wave pulses into a binary number representative of the magnitude and direction of the movement of the internal rod within the transducer.

Also coupled to the input/output circuit 220 is a foot switch 230 that causes the CPU to record the output of the transducer and display the result on the LCD screen 210. A function switch input 232 coupled to the input/output circuit provides the capability to select the system operating mode.

A keypad 236 coupled to the input/output interface 220 allows the user to enter data directly into the computer system if desired.

To allow the use of additional sensors, the input/output interface 220 is coupled to two Mitutoyo digital gauge compatible inputs 238 and 240. Data received on these inputs from a digital gauge (not shown) is read by the CPU 202, shown on the display screen 210. The data read is also routed through a Mitutoyo compatible digital gauge output connector 242 so that the data could be sent to another location for use in statistical process control, etc.

Finally, the input/output interface circuit 220 is able to read data from a pair of memory keys 250, 252. The keys Model No. DS 6201 Cyberkey manufactured by Dynasys of Clearwater, Fla., can store data in a small memory circuit that is backed up with an internal battery. The key 250 is associated with a particular gauge block and stores information concerning the calibration of the gauge block. In particular, the key 250 stores the values of $B_1$, $D_1$, $B_2$, $D_2$ and $W_1$ described above in order to allow the CPU 202 to calculate the correction factor δ for a particular fastener. In addition, the key can store information, such as the date when the gauge block was last calibrated, etc.

The memory key 252 stores information that is specific to a particular fastener style. In particular, the key stores the fastener's code, its engineering specifications or tolerances, and the value of W, that is used to determine whether the fastener meets the specifications. The key 252 also stores the procedure to be used in testing the fastener, including the number of samples to be taken and the range of head heights that are acceptable.

In operation, the quality control technician uses the fastener measurement system of the present invention by selecting a particular gauge block and conical inserts that are sized to receive the fastener style under investigation. The correct conical insert is fitted into the tapered bore of the gauge block, and the memory key 250 that accompanies the gauge block is inserted into the computer system 200. The computer system reads the memory key 250 to determine the calibration information. Next, the memory key 252 that is particular to the style and size of fastener being tested is inserted into the computer system. As described above, the data on the key 252 is read by the computer system to calculate the correction factor and to inform the computer system of the engineering specifications for the fastener, the number of fasteners to be sampled and the tolerances to be met.

With both keys 250 and 252 in place, the computer system generates a display on the touch screen 210 that instructs the user to obtain a number of fasteners for measurement. The user is then instructed to zero the sensor by placing the transducer assembly over the gauge block, with no fastener in place, and to close the foot switch. The computer then records the zero level of the transducer and all future measurements are made with respect to the zero sensor reading.

The user is then instructed by the computer system to insert a number of fasteners into the gauge block and to measure and record their head heights. After the desired number of fasteners have been measured, the computer system calculates and displays a histogram showing the various head heights as well as the mean head height and the standard deviation. Finally, the computer system produces an indication whether the sample of fasteners meets the engineering specifications. The computer system then prints a report of this information on the printer coupled to the printer interface 204 and the shipment of fasteners is either accepted or rejected.

Figure 8:
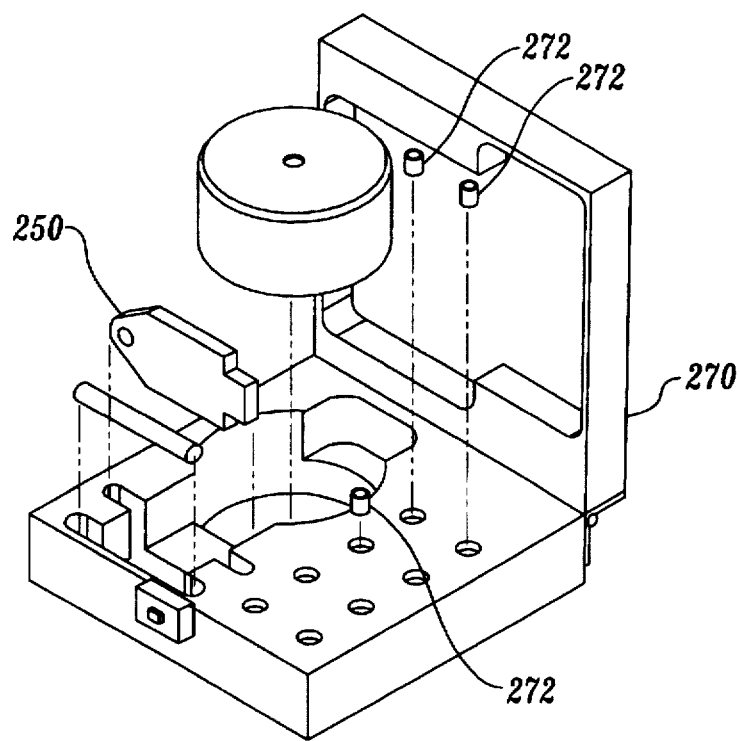
FIG. 8 illustrates how a gauge block according to the present invention is packaged.

FIG. 8 illustrates how the gauge blocks made according to the present invention are stored. A case 270 stores a single gauge block, a set of conical inserts 272 that are designed to fit a range of fasteners and a nylon rod for removing the inserts from the gauge block. In addition, each gauge block is stored with its own memory key 250 that stores information concerning the calibration of the gauge block.

As can be seen from the above description, the present invention is a fastener head height measuring system that eliminates the need for a separate gauge block to be provided for each fastener size to be measured. In addition, the gauge block has a chamfered or beveled outer edge so that wear of the block is minimized and the gauge block is easier to calibrate. The dedicated computer provides instructions concerning how many fasteners are to be measured and automatically determines whether the sample meets engineering specifications and, therefore, whether a shipment of fasteners should be accepted or rejected.

Although the present invention has been described with respect to its preferred embodiment, those skilled in the art will recognize that changes could be made without departing from the spirit and scope of the invention.

The embodiments of the invention in which an exclusive property or privilege is claimed are defined as follow:

1. A fastener head height measurement system comprising:
   a gauge block having a bore disposed therein in which a fastener whose head height is to be measured is inserted, the bore having a beveled surface at a point where the bore meets a top surface of the gauge block;

a transducer for producing an output signal that is indicative of a height of the fastener above the top surface of the gauge block; and a computer system coupled to receive the output signal of the transducer and for displaying the head height of the fastener.

2. The fastener head height measurement system of claim 1, wherein each fastener to be measured may have one of several shank diameters and wherein the bore in the gauge block is tapered, the system further comprising:

one or more conical inserts each having an exterior diameter that mates with the tapered bore in the gauge block, each conical insert having a bore disposed through a center of said each conical insert that is sized to receive a fastener with a predefined shank diameter.

3. The fastener head height measurement system of claim 1, wherein the computer system is adapted to receive a memory key that stores calibration information for a gauge block, the computer system being programmed to read the calibration information to compensate the output signal produced by the transducer.

4. A fastener head height measurement system for measuring a head height of a fastener that may have one of several shank dimensions, comprising:

a gauge block having a tapered bore disposed therein in which a fastener whose head height is to be measured is inserted, the tapered bore having a beveled surface at a point where the tapered bore meets a top surface of the gauge block;

one or more conical inserts each having an exterior diameter that mates with the tapered bore in the gauge block, each conical insert having a cylindrical bore that is sized to receive a fastener with a predefined shank dimension;

a transducer for producing an output signal that is indicative of a height of the fastener above the top surface of the gauge block; and a computer system coupled to receive the output signal of the transducer and for displaying the head height of the fastener.

5. The fastener head height measurement system of claim 4, wherein the computer system is adapted to receive a memory key that stores calibration information for a gauge block, the computer system being programmed to read the calibration information in order to compensate the output signal produced by the transducer.

6. The fastener head height measurement system of claim 5, wherein the computer system is adapted to receive a second memory key that can be read by the computer system, the second key storing information regarding a particular fastener to be measured.

7. The fastener head height measurement system of claim 6, wherein the information stored in the second memory key includes a fastener's specifications and tolerances.

8. The fastener head height measurement system of claim 6, wherein the information stored in the second memory key includes a procedure for determining whether a number of fasteners meet a quality standard.

9. A gauge block for use in a fastener head height measurement system of the type used to measure a head height of a fastener having one of several shank diameters, comprising:

a block made of a durable material having a tapered bore adapted to receive a fastener, the tapered bore having a diameter that is smaller than a diameter of a head portion of the fastener so that when the fastener is inserted into the tapered bore, the head of the fastener lies above a top surface of the block, the tapered bore further including a beveled surface at a point where the tapered bore meets a top surface of the gauge block; and one or more conical inserts having an exterior diameter that mates with the tapered bore in the gauge block, each conical insert have a cylindrical bore that is sized to receive a fastener with a predefined shank diameter.

* * * * *